United States Patent [19]

Gould

[11] Patent Number: 5,232,190

[45] Date of Patent: Aug. 3, 1993

[54] ARMREST CONTAINER HOLDER

[75] Inventor: Thomas J. Gould, Zeeland, Mich.

[73] Assignee: Prince Corporation, Holland, Mich.

[21] Appl. No.: 864,530

[22] Filed: Apr. 7, 1992

[51] Int. Cl.$^5$ .......................... A47C 7/00; A47C 16/00
[52] U.S. Cl. ................................ 248/311.2; 248/118; 297/194
[58] Field of Search ............... 248/311.2, 309.1, 315, 248/118; 297/194, 188; 224/42.42, 42.45 R; 220/727

[56] References Cited

U.S. PATENT DOCUMENTS

| 3,068,048 | 12/1962 | Mahon et al. | 297/194 |
| 3,690,724 | 9/1972 | Douglas et al. | 297/194 |
| 4,040,659 | 8/1977 | Arnold | 297/194 |
| 4,417,764 | 11/1983 | Marcus et al. | 297/194 |
| 4,434,829 | 3/1984 | Barnard | 248/99 X |
| 4,728,018 | 3/1988 | Parker | 224/42.42 X |
| 4,783,037 | 11/1988 | Flowerday | 248/311.2 |
| 4,854,536 | 8/1989 | Lorence et al. | 248/311.2 |
| 4,906,044 | 3/1990 | Wilstermann | 297/194 |
| 4,981,277 | 1/1991 | Elwell | 248/311.2 |
| 5,072,909 | 12/1991 | Huang | |

Primary Examiner—Karen J. Chotkowski
Attorney, Agent, or Firm—Price, Heneveld, Cooper, Dewitt & Litton

[57] ABSTRACT

An accessory for a vehicle includes opposing concave and elongated sides which are pivotally interconnected, each including upper surfaces forming an armrest. The opposing sides move in a clamshell-like motion between a first position adjacent one another and a second position in which the sides are spaced from each other. A resilient arcuate wall extends from one of said sides toward the opposite side to define a collapsible loop for holding containers as the sides are pivotally opened to the second position.

31 Claims, 2 Drawing Sheets

ARMREST CONTAINER HOLDER

BACKGROUND OF THE INVENTION

The present invention relates to vehicle armrests, and, in particular, to an armrest supporting a container.

Drivers and passengers often carry beverage containers and the like while riding in a vehicle, and thus desire convenient container holders. However, it has become increasingly difficult to satisfy this need given the downsizing of vehicles, and the limited passenger space available particularly in compact vehicles. One solution has been to create container holders that move between storage and use positions, such as holders that move in and out of a center console located between the vehicle front seats. However, not all vehicles have a center console. Further, it is often desirable to use the center console, if present, for other purposes, such as for storage of cassette tapes or personal effects. Still further, movable container holders tend to require complex mechanisms to facilitate their movement. These mechanisms are prone to service and installation problems, and further tend to be expensive.

Also, with reduced passenger space in the passenger compartment of vehicles, placement remains a problem, as does integration of the container holders into the vehicle interiors. Further, many passengers desire holders that are specific to the particular passenger, as opposed to being positioned generally between two passengers for use by either passenger. One solution has been to integrate a container holder into the vehicle armrest such that it extends forwardly of the armrest when extended for use. U.S. Pat. No. 4,783,037 discloses such a structure as does U.S. Pat. No. 4,792,184. Each of these structures, however, require relatively large armrests or significant space forward of the armrest for their use.

Thus, there remains a need for a container holder providing convenience, location, storeability and the ability to be readily incorporated into relatively compact vehicle interiors.

SUMMARY OF THE INVENTION

The present invention includes an armrest for a vehicle having opposing elongate members movably interconnected and including surfaces forming a support for a person's forearm. The opposing elongate members are movable between a first position adjacent each other and a second position in which at least a portion of the members are spaced from each other. The armrest further includes container holding means located between the elongate members, with the holding means being exposed when said members are in the second position. In the preferred embodiment, the container holding means includes a resilient wall that forms an aperture for receiving cups and the like when the opposing elongate members are in the open position, but folds to a compact storage position when the members are closed so that the assembly can be relatively compact and incorporated into existing vehicle interior designs.

These and other features, advantages, and objects of the present invention will be further understood and appreciated by those skilled in the art by reference to the following written specification, claims, and appended drawings in which:

DETAILED DESCRIPTION OF THE PREFERRED EMBODIMENT

Figure 1:
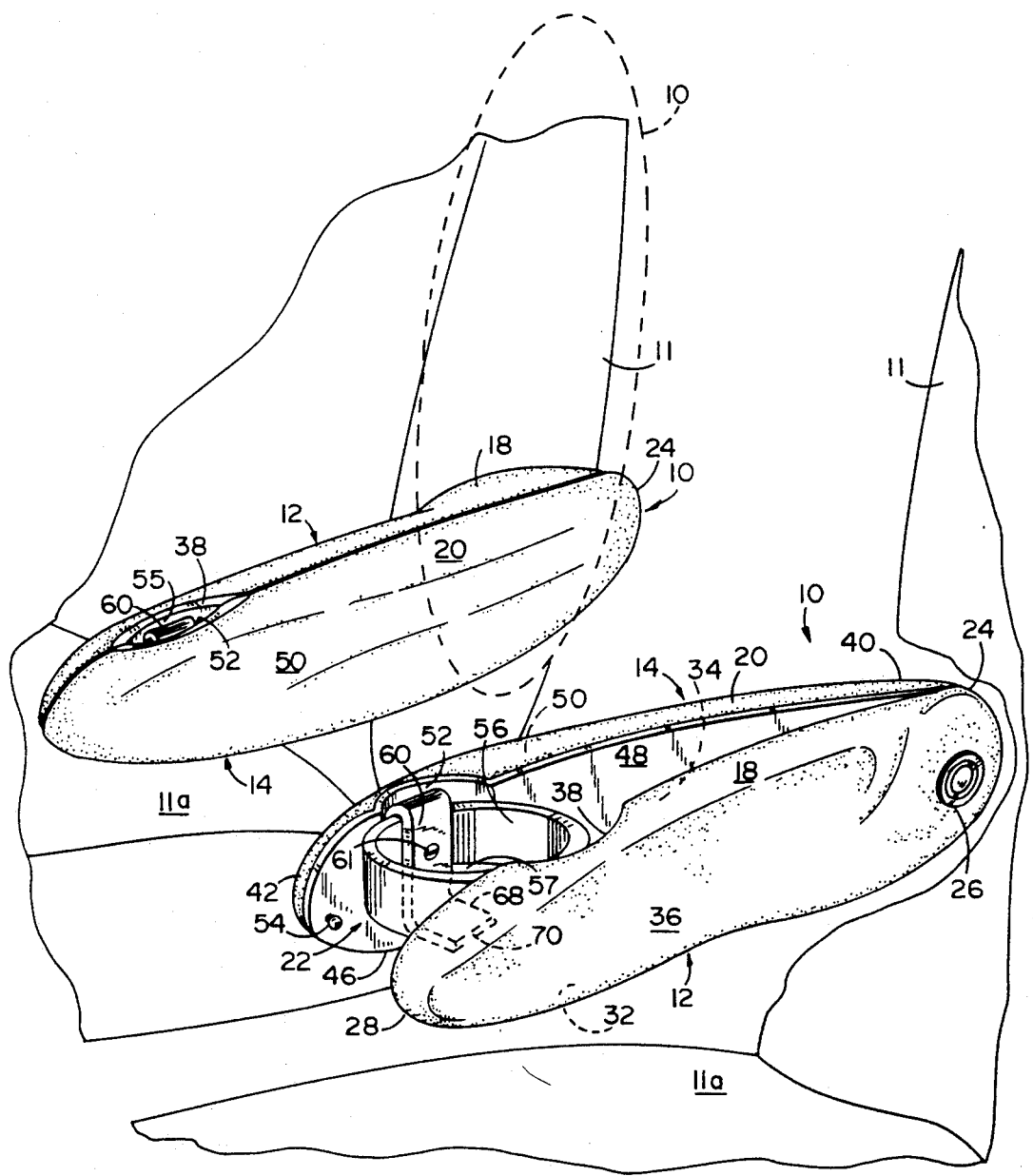
FIG. 1 is a fragmentary perspective view of a vehicle including a pair of armrests each having a container holder embodying the present invention with one shown in a first position and the other shown in a second position.
Figure 3:
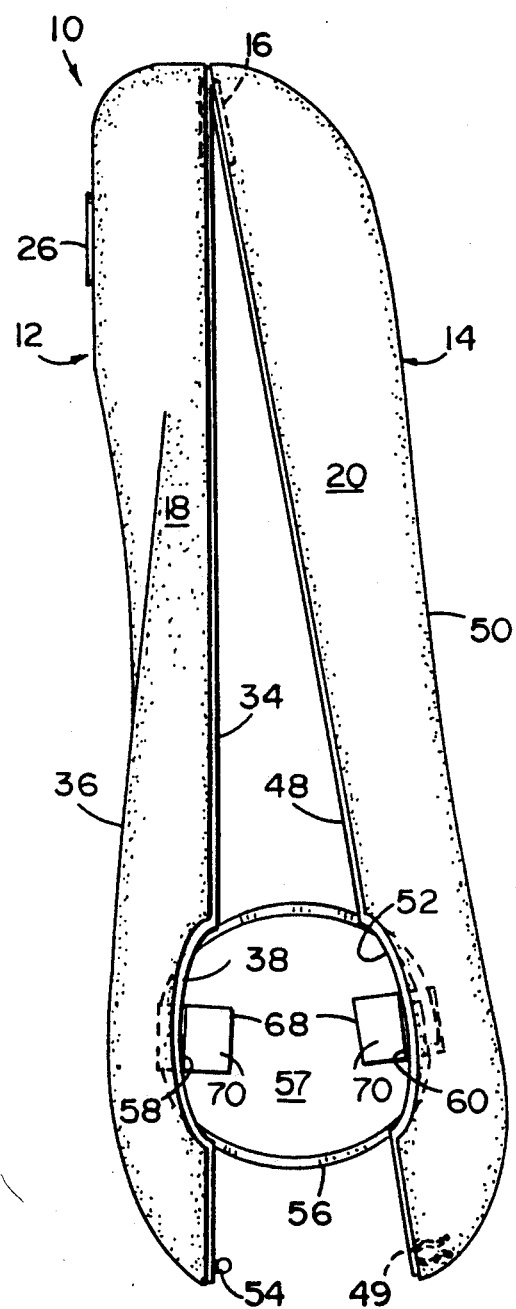
FIG. 3 is a top plan view of the armrest of FIG. 2 shown in a second position.

A pair of substantially identical armrests 10 (FIG. 1) are mounted to the facing sides 11 of the front seats 11a of a vehicle such as an automobile. Each of the armrests includes opposing elongated sides 12 and 14 pivotally interconnected by a hinge 16 (FIG. 3) near the rear of each side. The generally concave sides include upper surfaces 18 and 20 respectively forming arm supporting surfaces for a person's forearm. An accessory component 22 is operably coupled between sides 12 and 14 and moves to an exposed use position as sides 12 and 14 are pivoted from a closed position adjacent each other to an open use position spaced from each other. Each armrest 10 is conventionally rotatably mounted to the seat backs of the front vehicle seats to allow the armrests to be rotated forwardly to a lowered use position as seen or to a raised stored position adjacent the backs of the seats (shown in phantom).

Elongated side 12 has a contoured shape with a rear end 24 including a pivot mount 26 for rotatably coupling to the side 11 of the seat back, a forward end 28, and a midsection including upper surface 18. Side 12 further integrally includes a lower surface 32, inner surface 34, and an outer surface 36. At least upper surface 18 is padded and covered with material for comfort and aesthetics so that it can comfortably support a person's forearm. Inner surface 34 includes a forward portion with a recess 38 formed therein. Elongated side 14 is shaped substantially as a mirror image of side 12 and includes a rear 40, a forward end 42, and a midsection defined by upper surface 20. Side 14 also includes a lower surface 46, an inner surface 48, and an outer surface 50. Inner surface 48 includes a forward circular recess 52 therein that mateably aligns with recess 38 to form a pocket for receiving component 22 therein.

When sides 12 and 14 are closed, upper surfaces 18 and 20 align to form a comfortable substantially continuous surface for supporting a person's forearm. Members 12 and 14 can be pivotally opened about hinge 16 with a clamshell-like movement. Notably, hinge 16 need not be positioned only at the rear of member 12, but could be positioned forward thereof if member 14 was foreshortened. Further, it is contemplated that hinge 16 could be replaced by a number of different means permitting movement of sides 12 and 14 such as interconnecting parallel and pivotable links, telescoping guides, or the like.

Figure 2:
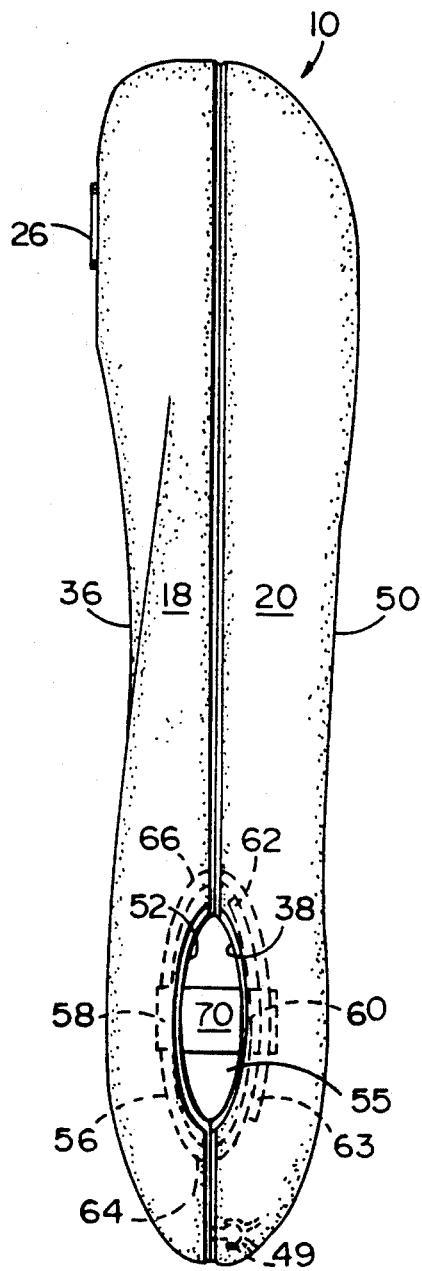
FIG. 2 is a top plan view of one of the armrests of FIG. 1 shown in a first position.

A latch comprised of a latch pin 54 with an enlarged head extends from inner surface 48 near the front end 28, and frictionally engages a mating aperture 49 (FIGS. 2 and 3) in inner surface 34 as sides 12 and 14 are moved to the closed position. The frictional retention can be accomplished by a leaf spring or the like, the force of which can be overcome by gripping the opening 55 formed by recesses 38 and 52 when sides 12 and 14 are closed, and forcing sides 12 and 14 apart.

Component 22 includes a resilient arcuate wall 56 that extends between sides 12 and 14. The height of wall 56 is sufficient to carry the weight of containers placed therein, but is sufficiently thin so that wall 56 is resiliently flexible. For such purpose, wall 56 is made of a resilient polymeric material such as polypropolene and has a section which is fixedly attached to inner surface 48 in recess 52 by a first loop 58 (FIG. 3), and free ends 62, 63 (FIG. 2) which are slideably held to inner surface 34 of opposite side 12 by a second loop 60. As sides 12 and 14 are moved apart, wall 56 resiliently unfolds to form a circular aperture 57 for receiving and holding a container such as a pop can, mug, or the like. Contrastingly, as sides 12 and 14 are moved together (FIG. 2), wall 56 resiliently collapses to fit within the sides 12 and 14. Thus, wall 56 will form a smaller circle 55, with ends 62 and 63 of wall 56 sliding within loop 60 to reduce the circular diameter formed by wall 56. Also, as the sides 12 and 14 are closed to the position shown in FIG. 2, wall 56 collapses to form a crushed oval shape with forward and rearward sharp bends 64 and 66.

When closed, resilient wall 56 biases sides 12 and 14 toward an open position. It is contemplated that a spring assist (not shown) could also be positioned between sides 12 and 14 such as at hinge 16 to further urge sides 12 and 14 apart once the holding retention force of latch 49 is overcome when opening the sides for access to the container holder so defined. One or more bottom supports 68 extend downwardly and inwardly from loops 58 and/or 60. Inner leg 70 of bottom supports 68 extends inwardly under aperture 57 formed by wall 56 to support containers placed therein. Legs 70 mateably slide over each other as sides 12 and 14 are closed. It is contemplated that a number of different bottom supports could be designed for use under aperture 57. Instead of a wall 56 with free ends, wall 56 could be made of a closed loop of material which is sufficiently flexible and resilient to collapse within sides 12 and 14 as they are closed. Although the accessory 22 shown is a container holder, other accessories could be conveniently mounted between sides 12 and 14 including, for example, coin holders, ashtrays, and small item satchels. It is also contemplated that sides 12 and 14 could be of different size so that one mateably fits into the side of the other. Alternatively, sides 12 and 14 could be joined at a midsection so that only the forward portion thereof pivots open.

Thus, the system of the present invention provides a useful holder for containers or the like in a position which is readily useable. Further, the container holder of the present invention can be moved to a storage position in which it is substantially hidden. Though only one embodiment is shown, it will become apparent to those of ordinary skill in the art that various modifications to the preferred embodiment of the invention can be made without departing from the spirit or scope thereof as defined by the appended claims.

The embodiments of the invention in which an exclusive property or privilege is claimed are defined as follows:

1. A vehicle accessory comprising:
a pair of elongated side members which are movably interconnected and which include upper surfaces forming an arm support when joined together, said side members being movable between a first arm support forming position adjacent each other and a second open position in which at least a portion of said side members are spaced from each other;
container holding means coupled to at least one of said side members and available for holding an item between said elongated side members when said side members are in said second position but being substantially hidden when said side members are in said first position; and
means for movably mounting said side members to a vehicle seat.

2. The apparatus as defined in claim 1 wherein said side members each include a first end and a second end, and including hinge means coupled to said side members for pivotally coupling said side members at a position adjacent said second end so that one of said side members can be moved relative to the other side member in a clamshell-like movement.

3. The apparatus as defined in claim 2 wherein said holding means defines a circularly-shaped aperture for receiving a container when said side members are in said second position.

4. The apparatus as defined in claim 3 wherein said holding means collapses as said one side member moves to said first position.

5. The apparatus as defined in claim 4 wherein said holding means defines an aperture which is adjustable in size for holding differently sized containers therein.

6. The apparatus as defined in claim 1 including latch means located on said second ends of said side members for releasably latching said second ends together in said first position.

7. The apparatus as defined in claim 6 including bias means for biasing said second ends toward one of said first or said second positions.

8. The apparatus as defined in claim 1 wherein said means for movably mounting said side members to a vehicle seat includes means for pivotally connecting one of said members to a seat back for movement between a raised position adjacent a side of the seat back and a lowered position extending generally horizontally.

9. The apparatus as defined in claim 1 wherein said side members are generally concave in cross section forming a pocket for said holding means when in said first position.

10. The apparatus as defined in claim 1 wherein said holding means is hidden when said side members are in said first position.

11. The apparatus as defined in claim 1 wherein said upper surfaces are padded and covered for comfort and appearance.

12. A vehicle accessory comprising:
a pair of opposing elongated side members having sides and also having surfaces forming an arm support, said side members each including a first end and a second end and being movably interconnected for movement between a first position adjacent each other and a second position in which at least a portion of said side members are spaced from each other;
hinge means coupled to said side members for pivotally coupling said side members at a position proximate said second end so that said side members can be moved open with a clamshell-like movement; and
holding means coupled to at least one of said side members for holding an item between said elongated members, said holding means being available for use when said side members are in said second position, said holding means including a resilient arcuately shaped wall defining an aperture which is adjustable in size for holding differently sized containers therein when said side members are in said second position, said resilient wall collapsing as said side members move to said first position.

13. A vehicle accessory comprising:
a pair of opposing elongated side members having sides and also having surfaces forming an arm support, said elongated side members being movably interconnected for movement between a first position adjacent each other and a second position in which at least a portion of said side members are spaced from each other;
holding means coupled to at least one of said side members for holding an item between said side members, said holding means being available for use when said side members are in said second position, said holding means including a resilient wall defining an aperture for holding a container therein;
latch means located on said side members for releasably latching said side members in said first position; and
bias means for biasing said side members toward one of said first positions and said second position.

14. The apparatus as defined in claim 13 wherein said holding means includes support means for supporting the bottom of a container placed therein.

15. The apparatus as defined in claim 13 wherein said resilient wall extends from one of said side members, and further including means coupled to one of said side members for slideably supporting said resilient wall.

16. An armrest assembly for a vehicle comprising:
an elongated armrest having a forward end, a rearward end and a horizontally laterally facing side;
an elongated member pivotally attached to said side;
a storage member mounted to said armrest side between said side and said elongated member, said storage member being adapted to collapse mateably against said side of said armrest; and
means for movably coupling said elongate member to said armrest side such that said elongated member is movable between a first position whereat said storage member is available for placing an object therein and a second position adjacent said side of said armrest whereat said storage member is collapsed.

17. The apparatus as defined in claim 16 wherein said storage member resiliently collapses as said elongated member is moved to said first position.

18. The apparatus as defined in claim 16 wherein said storage member includes a resilient arcuately shaped wall.

19. The apparatus as defined in claim 16 including latch means located on said side members for releasably latching said side members together in said first position.

20. The apparatus as defined in claim 16 wherein said holding means includes a bottom support for supporting the bottom of a container placed therein.

21. An armrest for a vehicle comprising:
a pair of side members each having a forward end, a rearward end, and sides,
hinge means for pivotally interconnecting said side members of said armrest;
a resilient storage member mounted to said armrest between said side members, said storage member mateably engaging said side members of said armrest and being positioned proximate said forward end; and
means for movably coupling said storage member between said armrest side members such that said side members are movable between a first position for placing an object in said storage member and a second position whereat said side members are adjacent each other.

22. The apparatus as defined in claim 21 wherein said storage member defines an aperture for holding a container when said storage member is in said first position.

23. An armrest for a vehicle comprising:
a pair of side members having a forward end, a rearward end and sides;
a resilient storage member mounted between said pair of side members, said storage member mateably engaging said sides of said side members and including a resilient arcuately shaped wall that extends from one side of one of said side members, a loop operably slideably securing said resilient wall to another of said sides between said two side members; and
means for movably coupling said storage member to said armrest side members such that said storage member is movable between a first position for placing an object therein and a second position adjacent said two side members of said armrest.

24. An armrest for a vehicle comprising:
a pair of side members having a forward end, a rearward end and sides, said side members being movably interconnected;
a resilient storage member mounted between said pair of said members, said storage member being adapted to mateably engage said sides of said side members;
means for movably coupling said storage member to said side members such that said storage member and said side members are movable between a first position in which said storage member is available for placing an object therein and a second position where said side members are positioned adjacently; and
bias means for biasing one of said side members toward one of said first position or said second position.

25. An armrest for a vehicle comprising:
a pair of side members having a forward end, a rearward end and at least one side;
a resilient storage member mounted to one side of said side members, said storage member mateably engaging said side of said one side member;
means for movably coupling said storage member to said one side member such that said storage member is movable between a first position wherein said storage member is available for placing an object therein and a second position adjacent said side members; and
means for pivotally attaching said side members to a seat back at said first end of said side members to that said armrest pivots between a raised position beside the seat back and a lowered position extending horizontally from the seat back.

26. An armrest for a vehicle comprising:
opposing elongate side members pivotally interconnected for forming a bifurcated structure which is movable between a first position adjacent each other and a second position in which at least a portion of said side members are spaced from each other, said side members including upper surfaces that abut to form a support for a person's arm when in said first position and further including means for movably mounting said side members to a vehicle seat for movement between a lowered position for use as an armrest and a raised position adjacent the seat for storage; and holding means defining aperture means attached between said elongate side members located along said portion of said side members for holding a container between said elongate side members, said holding means being available when said side members are in said second position but substantially hidden when said side members are in said first position.

27. The apparatus as defined in claim 26 wherein said aperture means collapses as said side members move to said first position.

28. The apparatus as defined in claim 27 wherein said aperture means includes a resilient arcuately shaped wall.

29. The apparatus as defined in claim 28 wherein said aperture means includes a bottom support for supporting the bottom of a container placed therein.

30. An armrest for a vehicle comprising:

opposing elongated side members pivotally interconnected for forming a bifurcated structure which is movable between a first position adjacent each other and a second position in which at least a portion of said side members are spaced from each other, said side members defining an armrest which is adapted to pivotally attach to a seat back and pivot between a raised position beside the seat back and a lowered position extending horizontally from said seat back; and holding means defining aperture means attached to said elongated side members located along said portion of said side members for holding a container between said elongate side members, said holding means being available when said side members are in said second position but substantially hidden when said side members are in said first position, said holding means collapsing as said side members move to said first position and including a resilient arcuately shaped wall and further including a bottom support for supporting the bottom of a container placed therein.

31. An armrest for a vehicle comprising;

opposing elongate side members pivotally interconnected for forming a bifurcated structure which is movable between a first position adjacent each other and a second position in which at least a portion of said side members are spaced from each other; and means defining aperture means attached to said elongate side members and located along said portion of said side members for holding a container between said elongate side members, said means being exposed when said side members are in said second position and substantially hidden when said side members are in said first position, said aperture defining means collapsing as said side members move to said first position and including a resilient arcuately shaped wall.

* * * * *

UNITED STATES PATENT AND TRADEMARK OFFICE
CERTIFICATE OF CORRECTION

PATENT NO. : 5,232,190

DATED : August 3, 1993

INVENTOR(S) : Thomas J. Gould

It is certified that error appears in the above-identified patent and that said Letters Patent is hereby corrected as shown below:

Column 6, line 36, claim 24;
"said members" should be --side members--.

Column 6, line 62, claim 25;
"to" should be --so--.

Signed and Sealed this

Seventeenth Day of May, 1994

Attest:

BRUCE LEHMAN

*Attesting Officer*  *Commissioner of Patents and Trademarks*